United States Patent
Zhang

(10) Patent No.: US 9,225,590 B2
(45) Date of Patent: Dec. 29, 2015

(54) GRACEFUL RESTART (GR) METHODS AND DEVICES

(71) Applicant: Hangzhou H3C Technologies Co., LTD., Hangzhou, Zhejiang (CN)

(72) Inventor: Haifeng Zhang, Beijing (CN)

(73) Assignee: HANGZHOU H3C TECHNOLOGIES CO., LTD., Zhejiang (CN)

(*) Notice: Subject to any disclaimer, the term of this patent is extended or adjusted under 35 U.S.C. 154(b) by 0 days.

(21) Appl. No.: 14/355,209

(22) PCT Filed: Dec. 24, 2012

(86) PCT No.: PCT/CN2012/087261
§ 371 (c)(1),
(2) Date: Apr. 29, 2014

(87) PCT Pub. No.: WO2013/097662
PCT Pub. Date: Jul. 4, 2013

(65) Prior Publication Data
US 2014/0301182 A1    Oct. 9, 2014

(30) Foreign Application Priority Data
Dec. 28, 2011  (CN) .......................... 2011 1 0455301

(51) Int. Cl.
*H04L 12/751* (2013.01)
*H04L 12/24* (2006.01)
(Continued)

(52) U.S. Cl.
CPC ............ *H04L 41/0654* (2013.01); *H04L 45/02* (2013.01); *H04L 45/22* (2013.01); *H04L 45/26* (2013.01); *H04L 45/28* (2013.01)

(58) Field of Classification Search
CPC ......... H04L 45/02; H04L 45/28; H04L 45/52; H04L 45/22; H04L 45/54; H04L 45/04
See application file for complete search history.

(56) References Cited

U.S. PATENT DOCUMENTS 7,508,772 B1 * 3/2009 Ward et al. .................... 370/254
8,799,419 B1 * 8/2014 Lin et al. ....................... 709/220
(Continued)

FOREIGN PATENT DOCUMENTS

CN    1744567       3/2006
CN    101072187    11/2007
(Continued)

OTHER PUBLICATIONS

International Search Report and Written Opinion dated Mar. 28, 2013 issued on PCT Patent Application No. PCT/CN2012/087261 filed on Dec. 24, 2012, The State Intellectual Property Office. P.R. China.
(Continued)

*Primary Examiner* — Raj Jain
(74) *Attorney, Agent, or Firm* — Mannava & Kang, P.C.

(57) ABSTRACT

This disclosure provides methods and devices for Graceful Restart (GR) in a network with multiple GR Restarters that include a first GR Restarter and at least one second GR Restarter corresponding to the first GR Restarter. After receiving routes from all normal neighbor network devices of the first GR Restarter, the first GR Restarter performs route selection to determine first selected routes, and sends the first selected routes to the at least one second GR Restarter. After receiving routes from the at least one second GR Restarter, the first GR Restarter performs route selection to determine second selected routes, updating a local Forwarding Information Base (FIB) at the first GR Restarter with the second selected routes, and sends the second selected routes to all neighbor network devices of the first GR Restarter. The first GR Restarter directly connects with the at least one second GR Restarter corresponding to the first GR Restarter.

25 Claims, 5 Drawing Sheets

(51) Int. Cl.
*H04L 12/707* (2013.01)
*H04L 12/703* (2013.01)
*H04L 12/721* (2013.01)

(56) References Cited

U.S. PATENT DOCUMENTS

2006/0171404 A1* 8/2006 Nalawade et al. ............ 370/401
2009/0213862 A1   8/2009 Zhang et al.
2009/0279557 A1* 11/2009 Wang et al. .................. 370/401

FOREIGN PATENT DOCUMENTS

| CN | 101753454 | 6/2010 |
|---|---|---|
| CN | 101860477 | 10/2010 |
| CN | 102571425 | 7/2012 |
| WO | WO-2005039129 | 4/2005 |
| WO | WO-2007139542 | 12/2007 |
| WO | WO-2011019697 | 2/2011 |
| WO | WO-2011045733 | 4/2011 |
| WO | WO-2013-097662 A1 | 7/2013 |

OTHER PUBLICATIONS

CN First Office Action dated Feb. 26, 2014, CN Patent Application No. 201110455301.X dated Dec. 28, 2011, State Intellectual Property Office of the P.R. China.

Extended European Search Report dated Apr. 20, 2015, EP Patent Application No. 12863216.3 dated Dec. 24, 2012, European Patent Office.

* cited by examiner

GRACEFUL RESTART (GR) METHODS AND DEVICES

The present application is a 371 application of International Application No. PCT/CN2012/087261 filed on Dec. 24, 2012 and entitled "Graceful Restart (GR) Methods and Devices," which claims the benefit of Chinese Patent Application No. 201110455301.X filed on Dec. 28, 2011.

BACKGROUND

In an application field with relatively high reliability requirements, when a host routing engine configured on a network device becomes abnormal or breaks down, a Graceful Restart (GR) function is used to ensure uninterrupted traffic forwarding. Two kinds of network devices, i.e. a GR Restarter and a GR Helper, used in the GR process are defined in the GR protocol. A failed network device which is restarted is called the GR Restarter, and a neighbor network device of the GR Restarter is called a GR Helper. The GR Restarter executes the GR function with the help of the GR Helper.

When a network device is restarted, the network device acting as the GR Restarter sends an open packet to all neighbor network devices acting as the GR Helpers to re-establish a connection, and performs route selection after receiving routes sent from all the neighbor network devices.

BRIEF DESCRIPTION OF THE DRAWINGS

Features of the present disclosure are illustrated by way of non-limiting examples in the following figure(s), in which.

DETAILED DESCRIPTION

For simplicity and illustrative purposes, the present disclosure is described by referring to non-limiting examples. In the following description, numerous specific details are set forth in order to provide a thorough understanding of the present disclosure. It will be readily apparent however, that the present disclosure may be practiced without limitation to these specific details. In some instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Graceful Restart is useful in many routing protocols such as Border Gateway Protocol (BGP), Open Shortest Path First (OSPF), and Intermediate System To Intermediate System (IS-IS) etc. BGP is a routing protocol for dynamically exchanging routing information between autonomous systems. The BGP is taken as external routing protocol standard of the Internet, and is widely used by the Internet Service Provider (ISP). In the following non-limiting examples, a GR process for BGP is used but it will be appreciated that other suitable routing protocols may also be used.

When the BGP of multiple neighbor network devices is restarted, the GR process may become infeasible because a deadlock situation might arise when two neighboring GR Restarters waits for routes from each other in order to perform route selection during the GR process. One example BGP GR process of the multiple neighbor network devices is described with reference to FIG. 1.

Figure 1:
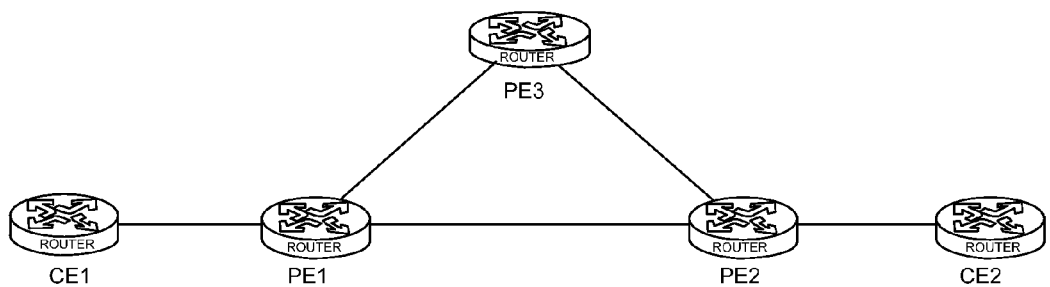
FIG. 1 is a schematic diagram illustrating structure of an example network based on a BGP protocol.

FIG. 1 is a schematic diagram illustrating structure of an example network for implementing a BGP protocol. The network includes various network devices: a Provider Edge (PE) 1, a PE2, a PE3, a Customer Edge (CE) 1 and a CE2. It will be appreciated that the devices in the network may be any routers, and switches etc. The PE1, PE2 and PE3 interconnect with each other. The CE1 connects with the PE1 and the CE2 connects with the PE2. Suppose that the BGP of the PE1 is restarted, and neighbor network devices PE2, PE3 and CE1 are normal, the PE1 is the GR Restarter and the PE2, PE3 and CE1 are GR Helpers. After the BGP of the PE1 is restarted, the PE1 respectively establishes the BGP connection with the PE2, PE3 and CE1. The PE2, PE3 and CE1 respectively send a route or routing information to the PE1. After receiving the routes sent from the PE2, PE3 and CE1, the PE1 performs route selection, updates a local Forwarding Information Base (FIB) with the result of the route selection. Then, the GR process ends.

However, if the BGP of both the PE1 and PE2 is restarted, both the PE1 and PE2 are the GR Restarters. The PE2, PE3 and CE1 are the GR Helpers of the PE1. The PE3 and CE1 are in a normal working state, and send routes to the PE1. Since the BGP of the PE2 is also restarted, the PE2 does not send the route to the PE1. The PE1, PE3 and CE2 are the GR Helpers of the PE2. The PE3 and CE2 are in a normal working state, and send the routes to the PE2. Since the BGP of the PE1 is restarted, the PE1 does not send a route to the PE2. Therefore, the PE1 and PE2 wait for a route from each other. In fact, the PE1 and PE2 cannot receive an End-Of-Rib (EOR) message that represents the completion of the initial routing update from each other, which results in deadlock.

In order to prevent or reduce the likelihood of the above deadlock problem, Request for Comments (RFC) 4724 provides that when the BGP of a network device is restarted, and a restart flag R needs to be configured in an Open packet. After receiving an Open packet carrying the restart flag R from a neighbor network device, the network device will not wait for the route sent from the neighbor network device. Although the network device will not wait for the route sent from the neighbor network device when its BGP restarts, the network device will delete the route previously received from the neighbor network device before BGP GR is performed, which results in interruption of traffic.

Figure 2:
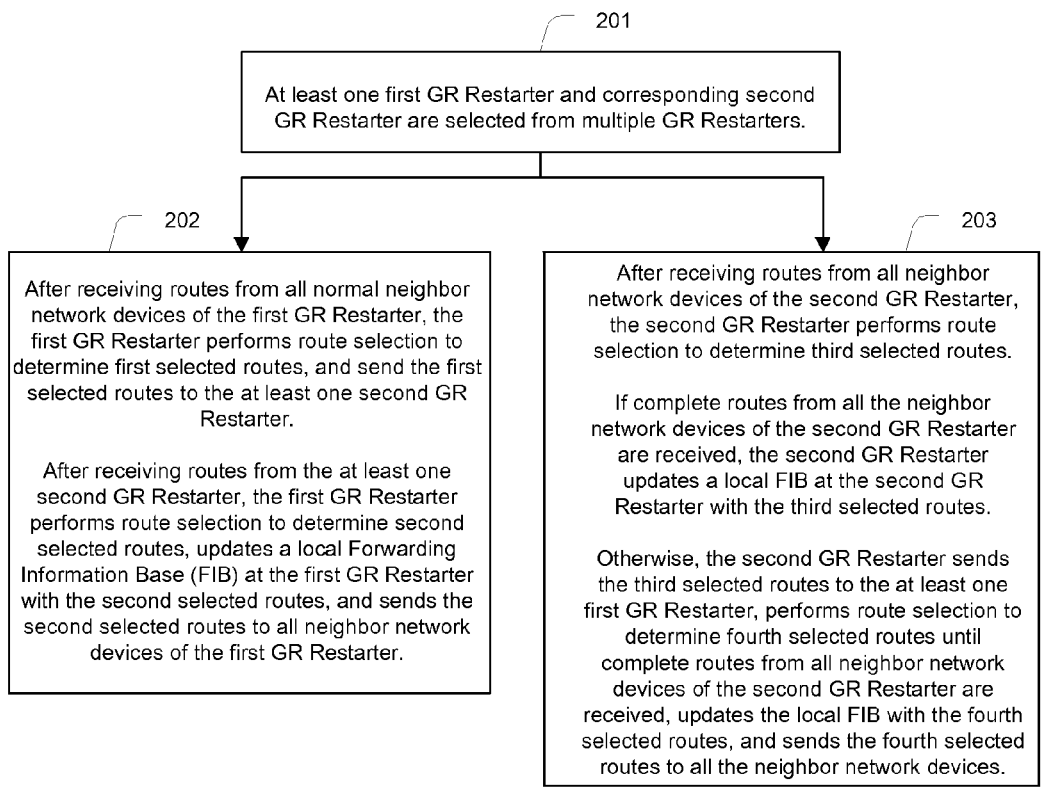
FIG. 2 is a flow chart illustrating a BGP GR method in accordance with an example of the present disclosure.

Referring to FIG. 2, which is a flow chart illustrating a GR method suitable for BGP in accordance with an example of the present disclosure. The method includes the following blocks.

Block 201: When there are multiple GR Restarters, the multiple GR Restarters include at least one first ("master") GR Restarter and a second ("slave") GR starter corresponding to each master GR Restarter. The master GR Restarter and slave GR Restarter may be selected from the multiple GR Restarters, for instance, they may be selected prior to the restarting process. As will be shown in the examples in FIGS. 3 to 6, each pair of master GR Restarter and slave GR Restarter in the network are directly connected with each other. Throughout the present disclosure, the term "directly connects" refers to a connection over the network layer (L3) of the Internet protocol suite. For example, the direct connection may be a Transmission Control Protocol (TCP) connection etc. The term "neighbor network devices" refers to network devices that are directly connected with each other over the network layer. However, network devices with direct connection over the network layer may be connected via other devices over the physical layer.

The multiple GR Restarters may form an aggregation, in which each GR Restarter in the aggregation directly connects with at least one other GR Restarter in the aggregation.

In this block, the method for selecting the at least one master GR Restarter and a slave GR Restarter corresponding to each master GR Restarter from the multiple GR Restarters includes: selecting, as the master GR Restarter, one GR Restarter from any two directly-connected GR Restarters in the multiple GR Restarters according to a pre-set rule, and taking the other GR Restarter as the slave GR Restarter of the master GR Restarter. The selection may be based on the identifier (ID) of the GR Restarters. For example, the pre-set rule may include: selecting the GR Restarter with the maximum or minimum ID from the two directly-connected GR Restarters as the master GR Restarter. The ID of each GR Restarter may uniquely identify the GR Restarter, and is different from the ID of any other GR Restarter. The two directly-connected GR Restarters may send packets carrying their IDs to each other, by which one party may obtain the ID of the other party. The selection of the master GR Restarter may be performed by the master or slave GR Restarter prior to the GR process. A master GR Restarter has at least one slave GR Restarters, and a slave GR Restarters has at least one master GR Restarter.

Block 202: From the master GR Restarter's perspective, after the master GR Restarter has received routes sent from all normal neighbor network devices of the master GR Restarter, route selection is performed to determine "first selected routes", and the first selected routes are sent to all the slave GR Restarter(s) of the master GR Restarter. If the master GR Restarter receives selected routes sent from all of its slave GR Restarter(s), route selection is performed to determine second selected routes, a local FIB at the master GR Restarter is updated with the second selected routes, and the second selected routes are sent to all neighbor network devices.

Before calculating the first selected routes, the master GR Restarter needs not wait for the routes sent from its slave GR Restarter(s). As long as routes are received from all the normal neighbor network devices, the master GR Restarter is able to perform route selection to determine the first selected routes, and sends the first selected routes to its slave GR Restarter(s). As such, the deadlock problem resulting from the GR Restarter and its neighbor GR Restarter waiting for the route sent from each other can be avoided. In the present disclosure, the "normal" neighbor network devices refer to the devices that are in normal working state and need not to be restarted.

Block 203: After the slave GR Restarter received routes from all of its neighbor network devices, the slave GR Restarter performs route selection to determine third selected routes.

If complete routes sent from all of its neighbor network devices are received, the local FIB is updated with the third selected routes;

otherwise, the third selected routes are sent to its master GR Restarter, route selection is performed to determine fourth selected routes until complete routes sent from all the neighbor network devices are received, the local FIB at the slave GR Restarter is updated with the fourth selected routes, and the fourth selected routes are sent to all the neighbor network devices.

Although the terms 'first', 'second', 'third' and 'fourth' have been used throughout the disclosure to refer to 'selected routes', it should be understood that they are merely labels for easy reference, and not intended to represent any specific sequence or order unless indicated otherwise. For example, in the case of 'third' and 'fourth' selected routes, the terms 'third' and 'fourth' are merely used to distinguish them from the 'first' and 'second' selected routes determined by the master (first) GR restarter.

The slave GR Restarter performs route selection to determine the third selected routes after receiving the routes sent from all the neighbor network devices including the master GR Restarter.

In practice, the local FIB is updated with the second selected routes after the master GR Restarter receives all the complete routes, and the second selected routes are sent to all the neighbor network devices. Before receiving all the complete routes, the master GR Restarter needs to exchange route information with its slave GR Restarter(s) one or more times, until all the complete routes are received. Similarly, the local FIB at the slave GR Restarter is updated with the fourth selected routes after the slave GR Restarter receives all the complete routes, and the fourth selected routes are sent to all the neighbor network devices. Before all the complete routes are received, the slave GR Restarter needs to exchange route information with its master GR Restarter(s) one or more times, until all the complete routes are received. Therefore, after the first selected routes are determined by the master GR Restarter, the method further includes: it is determined whether the complete routes sent from all the neighbor network devices are received. If yes, the local FIB is updated with the first selected routes; otherwise, the master GR Restarter continues to exchange route information with either all of its slave GR Restarter(s), or those which do not send the complete routes.

If the master GR Restarter continues to exchange route information with all of its slave GR Restarter(s), it needs to send the first selected routes to all of its slave GR Restarter(s). After sending the first selected routes to all of its slave GR Restarter(s), if the master GR Restarter receives the routes sent from all of its slave GR Restarter(s), the master GR Restarter needs to calculate the second selected routes, and determines whether all the completes routes are received. If yes (complete), the local FIB is updated with the second selected routes; otherwise (incomplete), the second selected routes are sent to all of its slave GR Restarter(s).

In this situation, the method for sending, by the master GR Restarter, the first selected routes to all of its slave GR Restarters includes:

if the master GR Restarter receives complete routes sent from all normal neighbor network devices of the master GR Restarter, but does not receive complete routes sent from its at least two (i.e. more than one) slave GR Restarters, denoting the first selected routes as incomplete routes, and sending the first selected routes denoted as incomplete routes to all the slave GR Restarter(s) of the master GR Restarter;

if the master GR Restarter receives complete routes sent from all the normal neighbor network devices of the master GR Restarter, but does not receive a complete route sent from at most one slave GR Restarter, denoting the first selected routes as complete routes, and sending the first selected routes denoted as complete routes to the at most one slave GR Restarter, denoting the first selected routes as incomplete routes, and sending the first selected routes denoted as incomplete routes to all the other slave GR Restarter(s), if any;

if the master GR Restarter does not receive the complete routes sent from all the normal neighbor network devices of the master GR Restarter, denoting the first selected routes as incomplete routes, and sending the first selected routes denoted as incomplete routes to all of its slave GR Restarters.

To summarise, if routes are not received from all normal neighbor network devices, the received routes are incomplete. If routes are received from all normal neighbor network devices, but not from more than one slave GR Restarter, the received routes are also incomplete. However, If routes are received from all normal neighbor network devices, but not from at most one slave GR Restarter, the received routes are complete.

A slave (second) GR Restarter "aggregation" may be used to represent the slave GR Restarter(s) that have not sent complete routes to the master GR Restarter. If the master GR Restarter exchanges route information with all the slave GR Restarter(s) which do not send complete routes, the master GR Restarter determines a slave GR Restarter aggregation, sends the first selected routes to all the slave GR Restarter(s) in the GR Restarter aggregation. After the master GR Restarter sends the first selected routes to all slave GR Restarter(s) in the slave GR Restarter aggregation, if the master GR Restarter receives routes sent from all the slave GR Restarter(s) in the slave GR Restarter aggregation, the master GR Restarter calculates the second selected routes, and determines whether all the complete routes are received. If complete routes are received, the local FIB is updated with the second selected routes; otherwise, the slave GR Restarter aggregation is determined again. The method for determining the slave GR Restarter aggregation may include: for each slave GR Restarter of the master GR Restarter, if a complete route of a slave GR Restarter is not received, the slave GR Restarter is added to the slave GR Restarter aggregation.

In this situation, the method for sending the first selected routes to all the slave GR Restarter(s) in the slave GR Restarter aggregation of the master GR Restarter may include:

if the master GR Restarter receives complete routes sent from all normal neighbor network devices of the master GR Restarter, and there are at least two GR Restarters in the slave GR Restarter aggregation, denoting the first selected routes as incomplete routes, and sending the first selected routes denoted as incomplete routes to all the slave GR Restarters in the slave GR Restarter aggregation;

if the master GR Restarter receives complete routes sent from all the normal neighbor network devices of the master GR Restarter, and there is at most one slave GR Restarter in the slave GR Restarter aggregation, denoting the first selected routes as complete routes, and sending the first selected routes denoted as the complete routes to the at most one slave GR Restarter;

if the master GR Restarter does not receive the complete routes sent from all the normal neighbor network devices, denoting the first selected routes as the incomplete routes, and sending the first selected routes denoted as the incomplete routes to all the slave GR Restarter(s) in the GR Restarter aggregation.

Similarly, after the slave GR Restarter performs route selection to determine the third selected routes, and before the local FIB is updated with the third selected routes, the method further includes: determining, by the slave GR Restarter, whether complete routes of all the neighbor network devices are received, and if yes, updating the local FIB with the third selected routes; otherwise, the slave GR Restarter continues to exchange route information with all of its master GR Restarter(s), or exchange route information with all master GR Restarter(s) which do not send the complete routes.

If the slave GR Restarter continues to exchange route information with all of its master GR Restarter(s), it needs to send the third selected routes to all of its master GR Restarter(s), calculates the fourth selected routes until the complete routes sent from all the neighbor network devices are received, updates the local FIB at the slave GR Restarter with the fourth selected routes, and sends the fourth selected routes to all the neighbor network devices.

In this situation, the method for sending the third selected routes to all of its master GR Restarters includes:

if the slave GR Restarter receives complete routes sent from all normal neighbor network devices, and if an incomplete route sent from one of its master GR Restarter(s) is not received, or if complete routes sent from all of its master GR Restarter(s) are received, but complete routes sent from at least two slave GR Restarter(s) are not received, denoting the third selected routes as incomplete routes, and sending the third selected routes denoted as incomplete routes to all of its master GR Restarter(s) and any other GR Restarter(s);

if the slave GR Restarter receives the complete routes sent from all the normal neighbor network devices, and if a complete route sent from its at most one slave GR Restarter is not received, denoting the third selected routes as the complete routes, and sending the third selected routes denoted as complete routes to the at most one slave GR Restarter, denoting the third selected routes as incomplete route, and sending the third selected routes denoted as incomplete routes to all of its master GR Restarter(s) and any other GR Restarter(s).

In the above, a master (first) GR Restarter "aggregation" may be used to represent the master GR Restarter(s) that have not sent complete routes to the slave GR Restarter. In this case, if the slave GR Restarter continues to exchange route information with all the master GR Restarter(s) which do not send the complete routes, the slave GR Restarter needs to determine a master GR Restarter aggregation, and sends the third selected routes to all the master GR Restarter(s) in the master GR Restarter aggregation, performs route selection to determine the fourth selected routes until complete routes sent from all of its neighbor network devices are received, updates the local FIB at the slave GR Restarter with the fourth selected routes, and sends the fourth selected routes to all of its neighbor network devices. The master GR Restarter aggregation may be determined as follows: for each of its master GR Restarter(s), if a complete route sent from the master GR Restarter is not received, adding the master GR Restarter to the master GR Restarter aggregation.

In this situation, the method for sending the third selected routes to all the master GR Restarter(s) in the master GR Restarter aggregation may include:

if the slave GR Restarter receives complete routes sent from all neighbor network devices, and if an incomplete route sent from one of its master GR Restarters is not received, denoting the third selected routes as incomplete routes, and sending the third selected routes denoted as the incomplete routes to the master GR Restarter;

if the slave GR Restarter receives the complete routes sent from all the normal neighbor network devices, and if a complete route sent from its at most one slave GR Restarter is not received, denoting the third selected routes as complete routes, and sending the third selected routes denoted as complete routes to the at most one slave GR Restarter, denoting the third selected routes as incomplete routes, and sending the third selected routes denoted as incomplete routes to all the master GR Restarter(s) in the master GR Restarter aggregation.

In the conventional method, after sending a route to its neighbor network devices, a network device needs to send an End-of-Rib (EOR) message to notify its neighbor network devices that the transmission of the route is completed. After receiving the EOR message sent from the network device, the neighbor network device determines that complete routes of the network device are received.

In the example of the present disclosure shown in FIG. 2, in order to determine whether the current GR Restarter has received all complete routes, the EOR messages are divided as two kinds of messages: one carries a Partial flag and the other does not (The EOR message in the conventional method does not carry the Partial flag).

When an EOR message carrying the Partial flag is sent, it denotes that the routes sent are selected routes determined in a situation where, other than a target network device receiving the EOR message, the complete routes sent from at least one neighbor network device are not received. For instance, a device A sends a route to a device B (i.e., the target network device), and sends an EOR message carrying the Partial flag, which denotes that at present, device A has not receive complete routes sent from at least one neighbor network device other than device B.

When an EOR message which does not carrying the Partial flag is sent, it denotes that the routes sent are selected routes determined in a situation where, other than the target network device, complete routes sent from all other neighbor network devices are received. For instance, the device A sends the route to the device B (target network device), and sends the EOR message which does not carry the Partial flag, which denotes that the device A receives the complete routes sent from all the neighbor network devices except for the device B.

Therefore, the method for denoting the first selected routes as complete routes includes: generating a first EOR message which does not carry the Partial flag. The method for sending the first selected routes which are denoted as complete routes to the slave GR Restarter includes: sending the first selected routes to the slave GR Restarter, and sending the first EOR message which does not carry the Partial flag to the slave GR Restarter.

The method for denoting the third selected routes as complete routes includes: generating a third EOR message which does not carry the Partial flag. The method for sending the third selected routes denoted as complete routes to the master GR Restarter includes: sending the third selected routes to the master GR Restarter, and sending the third EOR message which does not carry the Partial flag to the master GR Restarter.

The method for denoting the first selected routes as incomplete routes includes: generating a second EOR message carrying the Partial flag. The method for sending the first selected routes which are denoted as incomplete routes to the slave GR Restarter includes: sending the first selected routes to the slave GR Restarter, and sending the second EOR message carrying the Partial flag to the slave GR Restarter.

The method for denoting the third selected routes as incomplete routes includes: generating a fourth EOR message carrying the Partial flag. The method for sending the third selected routes to the master GR Restarter includes: sending the third selected routes to the master GR Restarter, and sending the EOR message carrying the Partial flag to the master GR Restarter.

The example BGP GR method shown in FIG. 2 is described hereafter with reference to FIGS. 3 to 6.

Figure 3:
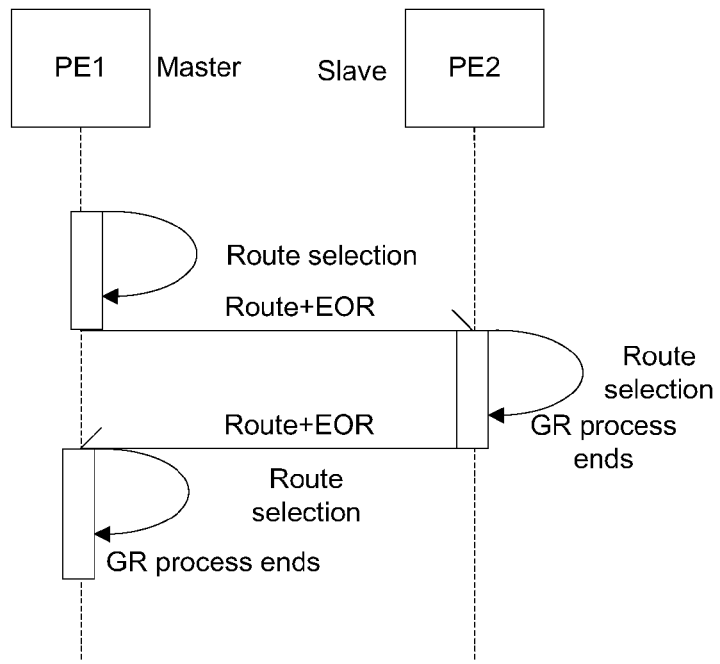
FIG. 3 is a schematic diagram illustrating a GR process of two GR Restarters in the network shown in FIG. 1 in accordance with an example of the present disclosure.

In the following example in FIG. 3, the BGP of two network devices is restarted. The GR process for restarting the BGP of the two network devices is described as follows.

Suppose that the BGP of network devices, i.e. PE1 and PE2 in FIG. 1 is restarted. The network devices, i.e. PE1 and PE2 are the GR Restarters. The PE1 and PE2 are sorted according to a descending order of the ID, and the sort result is PE1 and PE2 (i.e. PE1's ID is greater of the two).

According to the method in the example of the present disclosure shown in FIG. 2, one of the two directly-connected GR Restarters with the maximum ID is taken as the master GR Restarter. The GR process of PE1 and PE2 is shown in FIG. 3. FIG. 3 is a schematic diagram illustrating an example GR process of two GR Restarters in a TRILL (TRansparent Interconnection of Lots of Links) network shown in FIG. 1.

A master GR Restarter and a slave GR Restarter are selected from PE1 and PE2. The PE1 is selected as the master GR Restarter of the PE2, and the PE2 is selected as the slave GR Restarter of the PE1.

The PE1, acting as the master GR Restarter ("first GR Restarter") of the PE2, performs route selection to determine the selected routes after receiving routes sent from all the neighbor network devices, i.e. CE1 and PE3 except for its slave GR Restarter, i.e. the PE2. Since the PE1 receives complete routes from all the neighbor network devices except for the PE2, the selected routes are denoted as the complete routes (The Route+EOR is used for denoting that the sent routes are complete routes in FIGS. 3 to 5), and sent to the PE2. That is, the selected routes are sent to the PE2, and the EOR message which does not carry the Partial flag is sent to the PE2. After sending the routes, the CE1 and PE3, as GR Helpers in a normal working state, send the EOR message, which does not carry the Partial flag, to the PE1. It should be noted that in the following examples, after the GR Helpers in the normal working state sends the routes, the EOR message sent from the GR Helpers does not carry the Partial flag.

The PE2, acting as the slave GR Restarter ("second GR Restarter") of the PE1, performs route selection to determine the selected routes after receiving the routes sent from all the neighbor network devices, i.e. PE1, CE2 and PE3. Since the EOR messages sent from the PE1, CE2 and PE3 do not carry the Partial flag, it may be determined that all complete routes are received. The local FIB is updated with the selected routes, and the selected routes and the EOR message which does not carry the Partial flag are sent to all the neighbor network devices, i.e. PE1, CE2 and PE3, and the PE2 finishes the GR process.

After receiving the selected routes and the EOR message which does not carry the Partial flag sent from the PE2, the PE1 calculates the selected routes, and determines that all the complete routes are received. The local FIB is updated with the selected routes, the selected routes and the EOR message which does not carry the Partial flag are sent to all the neighbor network device, i.e. CE1, PE2 and PE3, and the PE1 finishes the GR process.

The PE1 and PE2 finish the GR process after receiving all the complete routes. The problem of traffic interruption can be avoided.

Figure 4:
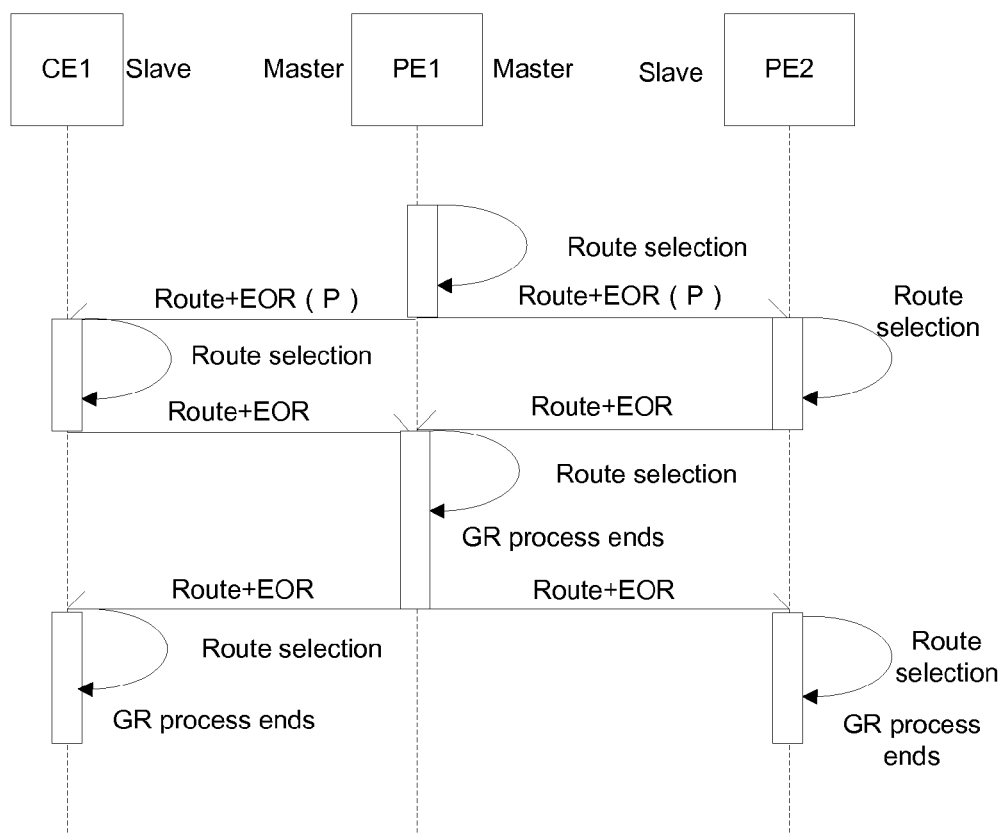
FIG. 4 is a schematic diagram illustrating a GR process of three GR Restarters in the network shown in FIG. 1 in accordance with an example of the present disclosure.

In the following example in FIG. 4, the BGP of three network devices is restarted. The GR process for restarting the BGP of the three network devices is as follows (taking route information exchange with all of its slave GR Restarter(s) or master GR Restarter(s) which do not send the complete routes for example).

Suppose that the BGP protocol of the network devices, i.e. CE1, PE1 and PE2 is restarted. The CE1, PE1 and PE2 are the GR Restarters. The CE1, PE1 and PE2 are sorted according to a descending order of the ID, and the sort result is PE1, PE2 and CE1.

According to the method of the example in the present disclosure shown in FIG. 2, one of each pair of two directly-connected GR Restarters with the maximum ID is taken as the master GR Restarter. The GR process of CE1, PE1 and PE2 is shown in FIG. 4. FIG. 4 is a schematic diagram illustrating a GR process of three GR Restarters in the network shown in FIG. 1 in accordance with an example of the present disclosure.

The master GR Restarters and slave GR Restarters are selected from any two directly-connected GR Restarters in the CE1, PE1 and PE2. The CE1 directly connects with the PE1. Since the ID of the PE1 is larger than that of the CE1, the PE1 is selected as the master GR Restarter of the CE1, and the CE1 is selected as the slave GR Restarter of the PE1. The PE1 directly connects with the PE2. Since the ID of the PE1 is larger than that of PE2, the PE1 is selected as the master GR Restarter of the PE2, and the PE2 is selected as the slave GR Restarter of the PE1.

The PE1 is selected as the master GR Restarter of the CE1 and PE2. After receiving the routes sent from the normal neighbor network device, i.e. the PE3 but not from its slave GR Restarters, i.e. CE1 and PE2, the PE1 calculates the selected routes, determines that a slave GR Restarter aggregation is {CE1, PE2}. Since the complete routes sent from at least two slave GR Restarters CE1 and PE2 are not received, the selected routes are denoted as the incomplete routes (In FIGS. 4 and 5, the Route+EOR (P) denotes that the sent routes are the incomplete routes), and sent to all the slave GR Restarters of the PE1, i.e. CE1 and PE2.

The CE1 is selected as the slave GR Restarter of the PE1. After receiving incomplete routes sent from the PE1, the CE1 performs route selection to determine the selected routes, and determines that a master GR Restarter aggregation is {PE1}. Since there is no other neighbor network device besides the PE1, it may be considered that complete routes of all the neighbor network devices except for the PE1 are received. Therefore, the selected routes are denoted as complete routes, and sent to the PE1.

The PE2 is selected as the slave GR Restarter of the PE1. After receiving routes from the PE3 and CE2, and incomplete routes from the PE1, the PE2 performs route selection to determine the selected routes, and determines that the master GR Restarter aggregation is {PE1}. Since complete routes sent from all the neighbor network devices except for the PE1 are received, the selected routes are denoted as complete routes, and sent to the PE1.

After receiving the routes denoted as complete routes sent from the CE1 and PE2, the PE1 performs route selection to determine the selected routes. Since the complete routes are received, the local FIB is updated with the selected routes, and the selected routes are denoted as complete routes, and sent to all the neighbor network devices, i.e. CE1, PE2 and PE3, and the PE1 finishes the GR process.

After receiving routes which are denoted as complete routes and sent from the PE1, CE1 performs route selection to determine the selected routes. Since all complete routes are received, the local FIB is updated with the selected routes, and the selected routes are denoted as complete routes, and sent to CE1's neighbor network device, i.e. PE1, and the CE1 finishes the GR process.

After receiving the routes denoted as complete routes from the PE1, PE2 performs route selection to determine the selected routes. Since all complete routes are received, the local FIB is updated with the selected routes, which are denoted as the complete routes, and sent to all of PE2's neighbor network devices, i.e. the PE1, PE3 and CE2, and the PE2 finishes the GR process.

The CE1, PE1 and PE2 finish the GR process. Since each GR Restarter finishes the GR process after receiving all the complete routes, the problem of traffic interruption can be avoided.

Figure 5:
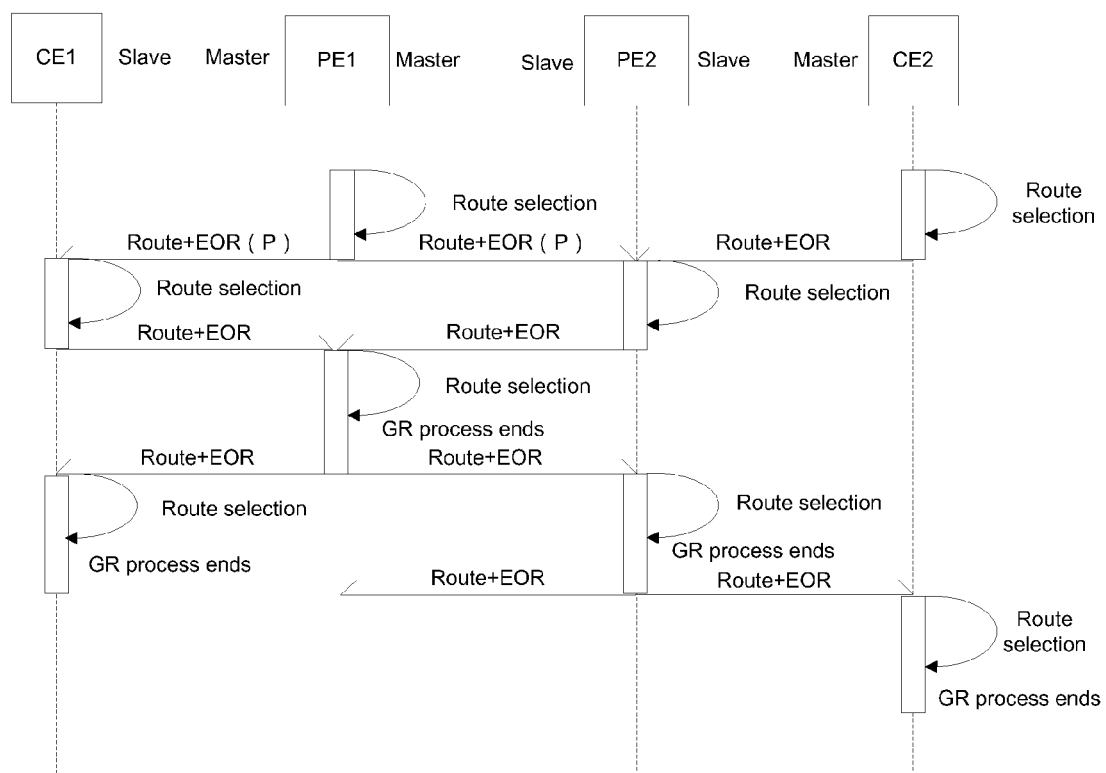
FIG. 5 is a schematic diagram illustrating a GR process of four GR Restarters in the network shown in FIG. 1 in accordance with an example of the present disclosure.

In the following example in FIG. 5, the BGP of four network devices is restarted. The GR process for restarting the BGP of the four network devices is as follows (taking the route information exchange with all of its slave GR Restarter(s) or master GR Restarter(s) which do not send the complete routes for example).

Suppose that the BGP protocol of the network devices, i.e. CE1, PE1, PE2 and CE2 shown in FIG. 1 is restarted. The CE1, PE1, PE2 and CE2 are the GR Restarters. The CE1, PE1, PE2 and CE2 are sorted according to a descending order of the ID, and the sort result is PE1, CE2, PE2 and CE1.

According to the method of the example in the present disclosure shown in FIG. 2, one of two directly-connected GR Restarters with the maximum ID is taken as the master GR Restarter. The GR process of CE1, PE1, PE2 and CE2 is shown in FIG. 5. FIG. 5 is a schematic diagram illustrating a GR process of four GR Restarters in the network shown in FIG. 1 in accordance with an example of the present disclosure.

The master GR Restarters and slave GR Restarters are selected from any two directly-connected GR Restarters in the CE1, PE1, PE2 and CE2. The CE1 directly connects with the PE1. Since the ID of the PE1 is larger than that of the CE1, the PE1 is selected as the master GR Restarter of the CE1, and the CE1 is selected as the slave GR Restarter of the PE1. The PE1 directly connects with the PE2. Since the ID of the PE1 is larger than that of PE2, the PE1 is selected as the master GR Restarter of the PE2, and the PE2 is selected as the slave GR Restarter of the PE1. The CE2 directly connects with the PE2. Since the ID of the CE2 is larger than that of the PE2, the CE2 is selected as the master GR Restarter of the PE2, and the PE2 is selected as the slave GR Restarter of the CE2.

The PE1 is selected as the master GR Restarter of the CE1 and PE2. After receiving routes from normal neighbor network device, i.e. the PE3 but not its slave GR Restarters, i.e. the CE1 and PE2, the PE1 calculates the selected routes. Since complete routes from CE1 and PE2 (i.e. at least two slave GR Restarters) are not received, the PE1 determines that the slave GR Restarter aggregation is {CE1, PE2}. The selected routes are denoted as incomplete routes, and sent to all the slave GR Restarters, i.e. the CE1 and PE2 in the slave GR Restarter aggregation.

CE2 is selected as the master GR Restarter of the PE2. The CE2 has no other neighbor network device except for the PE2, and it may be considered that complete routes of all neighbor network devices except for the PE2 (i.e. at most one slave GR Restarter) are received. Therefore, the CE2 performs route selection to determine the selected routes. Since the CE2 receives complete routes of all neighbor network devices except for the PE2, the slave GR Restarter aggregation is determined as {PE2}. The selected routes are denoted as the complete routes, and the complete routes are sent to the slave GR Restarter, i.e. PE2 in the slave GR Restarter aggregation.

The CE1 is selected as the slave GR Restarter of the PE1. The CE2 has no other neighbor network device except for the PE1, and it may be considered that complete routes of all the neighbor network devices except for the PE1 are received. After receiving the routes which are denoted as the incomplete routes and sent from the PE1, the CE1 performs route selection to determine the selected routes, and determines that the master GR Restarter aggregation is {PE1}. Since the routes sent from all the neighbor network devices except for the PE1 are received, the CE1 denotes the selected routes as the complete routes, and sends the complete routes to the PE1.

The PE2 is selected as the slave GR Restarter of the PE1 and CE2. After receiving the routes sent from the PE3, and the routes which are denoted as the incomplete routes and sent from the PE1 and the routes which are denoted as the complete routes and sent from the CE2, the PE2 performs route selection to determine the selected routes. Since the complete routes sent from the PE1 are not received, the master GR Restarter aggregation is determined as {PE1}, the selected routes are denoted as the complete routes, and the complete routes are sent to the PE1.

After receiving routes which are denoted as complete routes and sent from the CE1 and PE2, the PE1 performs route selection to determine the selected routes. Since all the complete routes are received, the local FIB is updated with the selected routes, the selected routes are denoted as complete routes, and sent to all the neighbor network devices, i.e. CE1, PE2 and PE3, and the PE1 finishes the GR process.

After receiving the routes which are denoted as complete routes and sent from the PE1, the CE1 performs route selection to determine the selected routes. Since all the complete routes are received, the local FIB is updated with the selected routes, the selected routes are denoted as the complete routes, and sent to the neighbor network device, i.e. the PE1, and the CE1 finishes the GR process.

After receiving the routes which are denoted as complete routes and sent from the PE1, the PE2 performs route selection to determine the selected routes. Since all the complete routes are received, the local FIB is updated with the selected routes, the selected routes are denoted as the complete routes, the complete routes are sent to all the neighbor network devices, i.e. the PE1, PE3 and CE2, and the PE2 finishes the GR process.

After receiving the routes which are denoted as the complete routes and sent from the PE2, the CE2 performs route selection to determine the selected routes. Since all the complete routes are received, the local FIB is updated with the selected routes, which are denoted as complete routes and sent to the neighbor network device, i.e. the PE2, the CE2 finishes the GR process.

Figure 6:
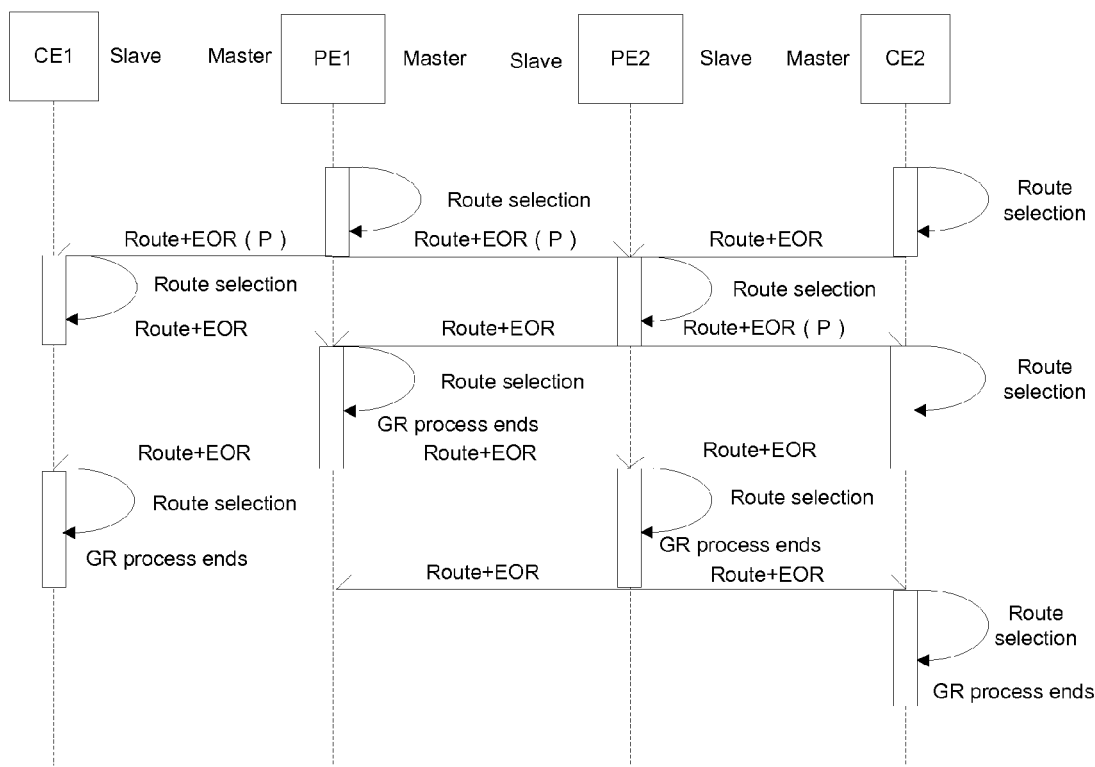
FIG. 6 is a schematic diagram illustrating another GR process of four GR Restarters in the network shown in FIG. 1 in accordance with an example of the present disclosure.

The GR process of the CE1, PE1, PE2 and CE2 is finished. Since each GR Restarter finishes the GR process after receiving all the complete routes, the problem of traffic interruption can be reduced if not avoided. If the route information exchange is performed with all slave GR Restarter(s) or master GR Restarter(s) for multiple times, the GR process of the CE1, PE1, PE2 and CE2 is slightly different from the above GR process. Referring to FIG. 6, FIG. 6 is a schematic diagram illustrating another GR process of four GR Restarters in the network shown in FIG. 1 in accordance with an example of the present disclosure. The specific process is not repeated here.

FIGS. 3, 4, 5 and 6 respectively show the GR process when the BGP of two, three and four network devices is restarted. In practice, the GR process of each GR Restarter may be different according to the number of the network devices, the BGP of which is restarted, and the specific situation of the selected master and slave GR Restarters, based on the above implementation principles.

The above describes several examples of the BGP GR method in detail. This disclosure further provides a BGP GR device, which may implement multiple-points failure protection.

Figure 7:
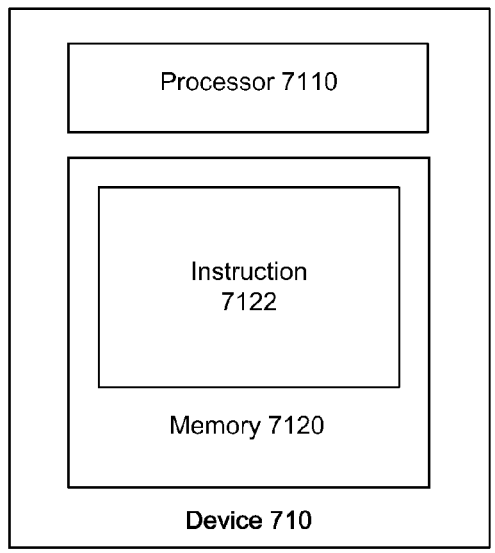
FIG. 7 is a schematic diagram illustrating structure of a GR Restarter in accordance with a first example of the present disclosure.

FIG. 7 is a schematic diagram illustrating structure of a device in capable of acting as a GR Restarter in a network with multiple GR Restarters that include a first GR Restarter and a corresponding second GR Restarter accordance with a first example of the present disclosure. It should be understood that the device 710 is capable of acting as the first GR Restarter (master), or the second GR Restarter (slave), or both the first GR Restarter and the second GR Restarter.

The GR Restarter in FIG. 7 includes: a memory 7120 storing instruction 7122, and a processor 7110 to execute the instruction 7122 to perform GR functions. When acting as a first GR Restarter, the processor 7110 is to execute instruction 7122 to:

after receiving routes from all normal neighbor network devices of the first GR Restarter, perform route selection to determine first selected routes, and send the first selected routes to the at least one second GR Restarter, and after receiving routes from the at least one second GR Restarter, perform route selection to determine second selected routes, update a local Forwarding Information Base (FIB) at the first GR Restarter with the second selected routes, and send the second selected routes to all neighbor network devices of the first GR Restarter.

The first GR Restarter directly connects with the at least one second GR Restarter corresponding to the first GR Restarter.

Additionally or alternatively, when acting as a second GR Restarter, the processor 7110 is to execute instruction 7122 to:

after receiving routes from all neighbor network devices of the second GR Restarter, perform route selection to determine third selected routes, if complete routes from all the neighbor network devices of the second GR Restarter are received, update a local FIB at the second GR Restarter with the third selected routes; and otherwise, send the third selected routes to the at least one first GR Restarter corresponding to second GR Restarter, perform route selection to determine fourth selected routes until complete routes from all neighbor network devices of the second GR Restarter are received, update the local FIB with the fourth selected routes, and send the fourth selected routes to all the neighbor network devices of the second GR Restarter.

The second GR Restarter directly connects with the at least one first GR Restarters corresponding to the second GR Restarter.

Although the selected routes determined by the slave (second) GR Restarter have been referred to as the 'third' and 'fourth' selected routes, it should be understood that the terms 'third' and 'fourth' are merely used to improve clarity and distinguish them from the 'first' and 'second' selected routes determined by the master (first) GR restarter. This also applies to the use of 'first' and 'second' selected routes determined by the first GR Restarter.

Figure 8:
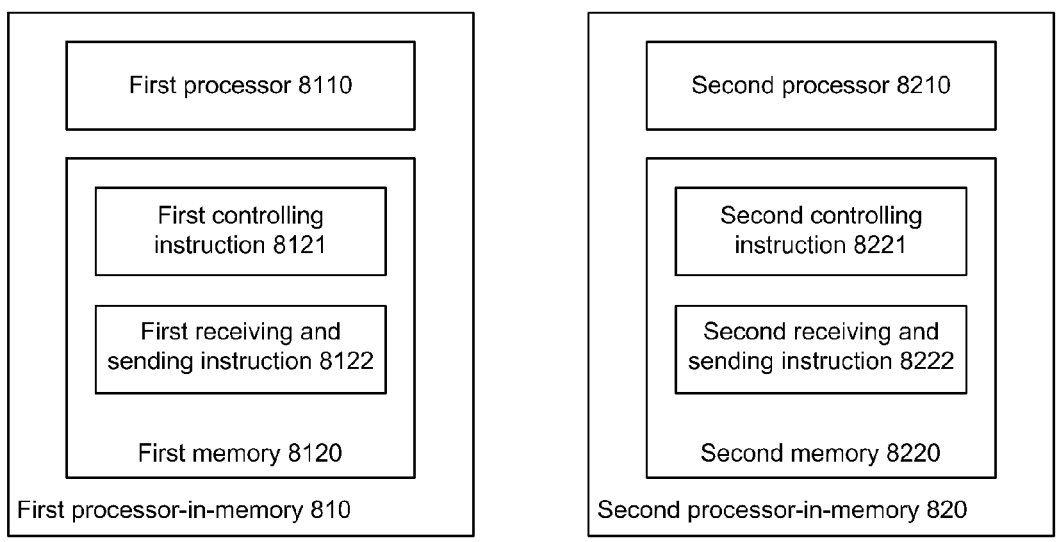
FIG. 8 is a schematic diagram illustrating structure of a GR Restarter in accordance with a second example of the present disclosure.

FIG. 8 is a schematic diagram illustrating structure of a GR Restarter device in accordance with a second example of the present disclosure. The GR Restarter includes at least one of:

a first processing unit 810 (e.g. processor-in-memory etc.) and a second processing unit 820 (e.g. processor-in-memory etc.).

As such, the GR Restarter may be capable of acting as a first GR Restarter (master), or a second GR Restarter (slave), or both (master and slave). In cases were the GR Restarter is capable as acting as both master and slave, it may be a master in relation or corresponding to at least one other slave GR Restarter and a slave in relation or corresponding to at least one other master GR Restarters, e.g. if there are three GR Restarters identified as A, B and C. GR Restarter A may be a master corresponding to slave GR Restarter B and a slave corresponding to master GR Restarter C.

For example, referring to FIG. 4 again, if the ID of CE1 is greater than that of PE1 in a different scenario, PE1 is a slave GR Restarter corresponding to master GR Restarter CE1. In this case, PE1 is capable of acting as both as a master (corresponding to slave PE2) and a slave (corresponding to master CE1). It should also be understood that a master may have more than one corresponding slave, and similarly, a slave may have more than one corresponding master. When the GR Restarter is capable of acting as both a master and slave, it will be appreciated that the functions of the first processing unit 810 and second processing unit 820 may be combined into a single processing unit (similar to the example in FIG. 7).

Throughout this disclosure, although the terms 'first' and 'second' have been used to refer to the 'processing units' or 'processor-in-memory' 810 and 820, 'memory' 8122 and 8222, 'processors' 8110 and 8210 and 'instruction' 8121, 8122, 8221 and 8222, it should be understood that the terms are merely labels for easy reference, and for distinguishing them from each other. In practice, they may not necessarily be separate entities in separate devices. Similarly, the terms 'first', 'second', 'third' and 'fourth' have been used to refer to notifications. Again, they are labels and should not be interpreted as implying any specific order or sequence.

The first processor-in-memory 810 includes: a first processor 8110 and a first memory 8120. The second memory processor 820 includes: a second processor 8210 and a second memory 8220.

The first processor 8110 communicates with the first memory 8120, executes instructions saved in the first memory 8120, and the second processor 8210 communicates with the second memory 8220, and executes instructions saved in the second memory 8220.

The first memory 8120 includes: a first controlling instruction 8121 and a first receiving and sending instruction 8122, and the second memory 8220 includes: a second controlling instruction 8221 and a second receiving and sending instruction 8222.

When the first processor-in-memory 810 is selected as a master GR Restarter (first GR Restarter) from multiple GR Restarters, the first controlling instruction 8121 is executed to:

after the first receiving and sending instruction 8122 receives routes from all normal neighbor network devices of the first GR Restarter, perform route selection to determine first selected routes, and send a first notification to the first receiving and sending instruction 8122, after the first receiving and sending instruction 8122 sends the first selected routes to the at least one second GR Restarter of the first GR Restarter according to the first notification and receiving routes from the at least one second GR Restarter of the first GR Restarter, performing route selection to determine second selected routes, update a local FIB at the first GR Restarter with the second selected routes, and send a second notification to the first receiving and sending instruction 8122.

The first receiving and sending instruction 8122 is executed to receive the routes from all the neighbor network devices, receive the first notification, send the first selected routes to the at least one second GR Restarter of the first GR Restarter, receive the second notification, and send the second selected routes to all the neighbor network devices of the first GR Restarter.

The first GR Restarter directly connects with the at least one second GR Restarter corresponding to the first GR Restarter. In one example, the network may implement a Border Gateway Protocol (BGP) or any other suitable routing protocol; and the first GR Restarter and each second GR Restarter are selected from the multiple GR Restarters as master GR Restarter and slave GR Restarter respectively. The multiple GR Restarters may form an aggregation.

When the second processor-in-memory 820 is selected as a slave GR Restarter from the multiple GR Restarters, the second controlling instruction 8221 is executed to:

after routes from all neighbor network devices of the second GR Restarter are received, perform route selection to determine third selected routes, update a local FIB at the second GR Restarter with the third selected routes if complete routes from all the neighbor network devices of the second GR Restarter are received, otherwise, send a third notification to the second receiving and sending instruction, perform route selection to determine fourth selected routes until the second receiving and sending instruction receives complete routes from all the neighbor network devices of the second GR Restarter, update the local FIB with the fourth selected routes, and send a fourth notification to the second receiving and sending instruction.

The second receiving and sending instruction 8222 is executed to receive the routes from the neighbor network devices of the second GR Restarter, receive the third notification, send the third selected routes to the at least one first GR Restarters of the second GR Restarter, receive the fourth notification, and send the fourth selected routes to all the neighbor network devices of the second GR Restarter.

The second GR Restarter directly connects with the at least one first GR Restarter corresponding to the second GR Restarter. The multiple GR Restarters may form an aggregation, in which each GR Restarter directly connects with at least one other GR Restarter in the aggregation. In one example, the network may implement a Border Gateway Protocol (BGP) or any other suitable routing protocol(s); and the second GR Restarter and each first GR Restarter are selected from the multiple GR Restarters as slave GR Restarter and master GR Restarter respectively.

The first controlling instruction 8121 is further executed to determine, after the first selected routes are determined by performing route selection, whether complete routes from all neighbor network devices of the first GR Restarter are received, and if yes, update the local FIB with the first selected routes;

the first receiving and sending instruction is further executed to send the first selected routes to all second GR Restarters of the first GR Restarter.

The first receiving and sending instruction 8122 is further executed to send the first selected routes to all second GR Restarters of the master GR Restarter.

The second receiving and sending instruction 8222 is further executed to send the third selected routes to all the master GR Restarters of the slave GR Restarter.

The first receiving and sending instruction 8122 is further executed to if complete routes from all the normal neighbor network devices of the first GR Restarter are received and if complete routes from at least two second GR Restarters of the first GR Restarter are not received,
  denote the first selected routes as incomplete routes, and
  send the first selected routes denoted as the incomplete routes to all second GR Restarters of the first GR Restarter,
if the complete routes from all the normal neighbor network devices of the first GR Restarter are received and a complete route from at most one second GR Restarter of the first GR Restarter is not received,
  denote the first selected routes as the complete routes, and
  send the first selected routes denoted as the complete routes to the at most one second GR Restarter,
  denote the first selected routes as the incomplete routes, and
  send the first selected routes denoted as the incomplete routes to any other second GR Restarter of the first GR Restarter,
if complete routes from all normal neighbor network devices of the first GR Restarter are not received,
  denote the first selected routes as the incomplete routes, and
  send the first selected routes denoted as the incomplete routes to all second GR Restarters of the first GR Restarter.

The second receiving and sending instruction 8222 is further executed to if the second GR Restarter receives complete routes from all normal neighbor network devices of the second GR Restarter and if an incomplete route from one first GR Restarter of the second GR Restarter is not received, or
if complete routes from all the first GR Restarters are received but complete routes from at least two second GR Restarters of the second GR Restarter are not received,
  denote the third selected routes as incomplete routes, and
  send the third selected routes denoted as the incomplete routes to all first GR Restarters of the second GR Restarter and any other GR Restarter,
if the second GR Restarter receives complete routes from all the normal neighbor network devices of the second GR Restarter and does not receive a complete route from at most one second GR Restarter of the second GR Restarter,
  denote the third selected routes as the complete routes, and
  send the third selected routes denoted as the complete routes to the at most one second GR Restarter,
  denote the third selected routes as the incomplete routes, and
  send the third selected routes denoted as the incomplete routes to all first GR Restarters of the second GR Restarter and any other GR Restarter.

The first controlling instruction 8121 is further executed to determine, after the first selected routes are determined, whether complete routes from all the neighbor network devices of the first GR Restarter are received, and if yes, update the local FIB with the first selected routes, and add, if the first GR Restarter does not receive a complete route from a second GR Restarter, the second GR Restarter to a second GR Restarter aggregation.

The first receiving and sending instruction 8122 is further executed to send the first selected routes to all second GR Restarters in the second GR Restarter aggregation of the first GR Restarter.

The second controlling instruction 8221 is further executed to add the first GR Restarter to a first GR Restarter aggregation if a complete route sent from the first GR Restarter is not received.

The second receiving and sending instruction 8222 is further executed to send the third selected routes to all first GR Restarters in the first GR Restarter aggregation of the second GR Restarter.

The first receiving and sending instruction 8122 is further executed to:
  denote, if complete routes sent from all the normal neighbor network devices of the first GR Restarter are received and if there are at least two second GR Restarters in the second GR Restarter aggregation, the first selected routes as incomplete routes, and send the first selected routes denoted as incomplete routes to all second GR Restarters in the second GR Restarter aggregation,
  denote, if the complete routes sent from all the normal neighbor network devices of the first GR Restarter are received and there is at most one second GR Restarter in the second GR Restarter aggregation, the first selected routes as the complete routes, and send the first selected routes denoted as the complete routes to the at most one second GR Restarter,
  denote, if complete routes sent from all the normal neighbor network devices of the first GR Restarter are not received, the first selected routes as the incomplete routes, and send the first selected routes denoted as the incomplete routes to all the second GR Restarters in the second GR Restarter aggregation.

The second receiving and sending instruction 8222 is further executed to:
  if the second GR Restarter receives complete routes sent from all normal neighbor network devices of the second GR Restarter and if an incomplete route sent from one first GR Restarter of the second GR Restarter is not received,
    denote the third selected routes as the incomplete routes, and send the third selected routes denoted as the incomplete routes to the first GR Restarter,
  if the second GR Restarter receives complete routes sent from all normal neighbor network devices of the second GR Restarter and does not receive a complete route sent from at most one second GR Restarter,
    denote the third selected routes as complete routes, and send the third selected routes denoted as complete routes to the at most one second GR Restarter,
    denote the third selected routes as incomplete routes, and send the third selected routes denoted as incomplete routes to all the first GR Restarters in the first GR Restarter aggregation.

The first receiving and sending instruction 8122 is further executed to denote the first selected routes as the complete routes by generating a first EOR message which does not carry a Partial flag, and denote the first selected routes as the incomplete routes by generating a second EOR message carrying the Partial flag.

The second receiving and sending instruction 8222 is further executed to denote the third selected routes as the complete routes by generating a third EOR message which does not carry the Partial flag, and denote the third selected routes as the incomplete routes by generating a fourth EOR message carrying the Partial flag.

The above are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A Graceful Restart (GR) method for a network with multiple GR Restarters that include a first GR Restarter and at least one second GR Restarter corresponding to the first GR Restarter, the method comprising the first GR Restarter:

after receiving information on routes from all normal neighbor network devices of the first GR Restarter, performing route selection to determine first selected routes, and sending information on the first selected routes to the at least one second GR Restarter, after receiving information on routes from the at least one second GR Restarter, performing route selection to determine second selected routes, updating a local Forwarding Information Base (FIB) at the first GR Restarter with information on the second selected routes, and sending the information on the second selected routes to all neighbor network devices of the first GR Restarter;

wherein the first GR Restarter directly connects with the at least one second GR Restarter corresponding to the first GR Restarter.

2. The method according to claim 1, wherein the network implements a Border Gateway Protocol (BGP), and wherein the first GR Restarter and each second GR Restarter are selected from the multiple GR Restarters as master GR Restarter and slave GR Restarter respectively and the multiple GR Restarters form an aggregation.

3. The method according to claim 1, wherein after the first selected routes are determined, the method further comprises:

determining whether complete routes from all neighbor network devices of the first GR Restarter are received, and if yes, updating the local FIB with the information on the first selected routes; and sending the information on the first selected routes to all second GR Restarters corresponding to the first GR Restarter.

4. The method according to claim 3, wherein sending the information on the first selected routes to all second GR Restarters of the first GR Restarter comprises:

if information on complete routes from all normal neighbor network devices of the first GR Restarter are received and information on complete routes from at least two second GR Restarters corresponding to first GR Restarter are not received, denoting the first selected routes as incomplete routes, and sending the information on the first selected routes denoted as the incomplete routes to all second GR Restarters corresponding to first GR Restarter, if the information on the complete routes from all normal neighbor network devices of the first GR Restarter are received but information on a complete route from at most one second GR Restarter corresponding to first GR Restarter is not received, denoting the first selected routes as the complete routes, and sending the information on the first selected routes denoted as the complete routes to the at most one second GR Restarter, denoting the first selected routes as the incomplete routes, and sending the information on the first selected routes denoted as the incomplete routes to any other second GR Restarter corresponding to first GR Restarter, if the information on complete routes from all normal neighbor network devices of the first GR Restarter are not received, denoting the first selected routes as the incomplete routes, and sending the information on the first selected routes denoted as the incomplete routes to all second GR Restarters corresponding to first GR Restarter.

5. The method according to claim 1, wherein after the first selected routes are determined, the method further comprises:

determining whether information on complete routes from all neighbor network devices of the first GR Restarter are received, and if yes, updating the local FIB with the first selected routes;

if the first GR Restarter does not receive information on a complete route from a second GR Restarter, adding the second GR Restarter to a second GR Restarter aggregation; and sending the information on the first selected routes to the at least one second GR Restarter corresponding to first GR Restarter, wherein sending the information on the first selected routes further comprises sending the information on the first selected routes to all second GR Restarters in the second GR Restarter aggregation of the first GR Restarter.

6. The method according to claim 4, wherein denoting the first selected routes as the complete routes comprises:

generating a first End-of-RIB (EOR) message which does not carry a Partial flag; and denoting the first selected routes as the incomplete routes, wherein denoting the first selected routes as the incomplete routes comprises generating a second EOR message carrying the Partial flag.

7. The method according to claim 2, wherein each of the at least one first GR Restarter corresponding to the second GR Restarter is selected from one of two directly-connected GR Restarters in the multiple GR Restarters with the maximum or minimum ID.

8. A Graceful Restart (GR) method for a network with multiple GR Restarters that include a second GR Restarter and at least one first GR Restarter corresponding to the second GR Restarter, the method comprising the second GR Restarter:

after receiving information on routes from all neighbor network devices of the second GR Restarter, performing route selection to determine first selected routes, if information on complete routes from all the neighbor network devices of the second GR Restarter are received, updating a local FIB at the second GR Restarter with information on the first selected routes;

otherwise, sending information on the first selected routes to the at least one first GR Restarter corresponding to second GR Restarter, performing route selection to determine second selected routes until information on complete routes from all neighbor network devices of the second GR Restarter are received, updating the local FIB with information on the second selected routes, and sending the information on the second selected routes to all the neighbor network devices of the second GR Restarter;

wherein the second GR Restarter directly connects with the at least one first GR Restarters corresponding to the second GR Restarter.

9. The method according to claim 8, wherein the network implements a Border Gateway Protocol (BGP), and wherein the second GR Restarter and each first GR Restarter are selected from the multiple GR Restarters as slave GR Restarter and master GR Restarter respectively and the multiple GR Restarters form an aggregation.

10. The method according to claim 8, wherein sending the information on the first selected routes to the at least one first GR Restarter corresponding to the second GR Restarter comprises sending the information on the first selected routes to all first GR Restarters corresponding to second GR Restarter.

11. The method according to claim 10, wherein sending the information on the first selected routes to all first GR Restarters corresponding to second GR Restarter comprises:
   if the second GR Restarter receives information on complete routes from all normal neighbor network devices of the second GR Restarter and if information on an incomplete route from one first GR Restarter corresponding to second GR Restarter is not received; or
   if information on complete routes from all first GR Restarters are received but information on complete routes from at least two second GR Restarters are not received,
      denoting the first selected routes as incomplete routes, and
      sending the information on the first selected routes denoted as the incomplete routes to all first GR Restarters corresponding to second GR Restarter and any other GR Restarter,
   if the second GR Restarter receives the information on complete routes from all normal neighbor network devices of the second GR Restarter and does not receive information on a complete route from at most one master GR Restarter corresponding to second GR Restarter,
      denoting the first selected routes as the complete routes, and
      sending the information on the first selected routes denoted as the complete routes to the at most one second GR Restarter,
      denoting the first selected routes as the incomplete routes, and
      sending the information on the first selected routes denoted as the incomplete routes to all first GR Restarters corresponding to second GR Restarter and any other GR Restarter.

12. The method according to claim 8, wherein the method further comprises:
   adding, if information on a complete route from a first GR Restarter is not received, the first GR Restarter to a first GR Restarter aggregation; and sending the information on the first selected routes to the first GR Restarters corresponding to second GR Restarter, wherein sending the information on the first selected routes comprises sending the information on the first selected routes to all first GR Restarters in the first GR Restarter aggregation of the second GR Restarter.

13. The method according to claim 11, wherein denoting the first selected routes as the complete routes comprises:
   generating a first End-of-RIB (EOR) message which does not carry the Partial flag; and
   denoting the first selected routes as the incomplete routes, wherein denoting the first selected routes as the incomplete routes comprises generating a second EOR message carrying the Partial flag.

14. A device capable of acting as a first Graceful Restart (GR) Restarter in a network with multiple GR Restarters that include the first GR Restarter and at least one second GR Restarter corresponding to the first GR Restarter, the device comprising:
   a memory and a processor to execute instructions in the memory to:
      after receiving information on routes from all normal neighbor network devices of the first GR Restarter, perform route selection to determine first selected routes, and send information on the first selected routes to the at least one second GR Restarter,
      after receiving information on routes from the at least one second GR Restarter, perform route selection to determine second selected routes, update a local Forwarding Information Base (FIB) at the first GR Restarter with information on the second selected routes, and send the information on the second selected routes to all neighbor network devices of the first GR Restarter;
   wherein the first GR Restarter directly connects with the at least one second GR Restarter corresponding to the first GR Restarter.

15. The device according to claim 14, wherein the network implements a Border Gateway Protocol (BGP), and wherein the first GR Restarter and each second GR Restarter are selected from the multiple GR Restarters as master GR Restarter and slave GR Restarter respectively, and the multiple GR Restarters form an aggregation.

16. The device according to claim 14, wherein the processor further executes instructions to:
   determine, after the first selected routes are determined, whether information on complete routes from all neighbor network devices of the first GR Restarter are received, and if yes,
   update the local FIB with the information on the first selected routes; and
   send the information on the first selected routes to all second GR Restarters corresponding to first GR Restarter.

17. The device according to claim 16, wherein the processor further executes instructions to:
   if information on complete routes from all the normal neighbor network devices of the first GR Restarter are received and if information on complete routes from at least two second GR Restarters corresponding to first GR Restarter are not received,
      denote the first selected routes as incomplete routes, and
      send the information on the first selected routes denoted as the incomplete routes to all second GR Restarters corresponding to first GR Restarter,
   if the information on the complete routes from all the normal neighbor network devices of the first GR Restarter are received and information on a complete route from at most one second GR Restarter corresponding to first GR Restarter is not received,
      denote the first selected routes as the complete routes, and
      send the information on the first selected routes denoted as the complete routes to the at most one second GR Restarter,
      denote the first selected routes as the incomplete routes, and
      send the information on the first selected routes denoted as the incomplete routes to any other second GR Restarter corresponding to first GR Restarter,
   if the information on complete routes from all normal neighbor network devices of the first GR Restarter are not received,
      denote the first selected routes as the incomplete routes, and
      send the information on the first selected routes denoted as the incomplete routes to all second GR Restarters corresponding to first GR Restarter.

18. The device according to claim 14, wherein the processor further executes instructions to:
- determine, after the first selected routes are determined, whether information on complete routes from all the neighbor network devices of the first GR Restarter are received, and if yes,
- update the local FIB with the information on the first selected routes, and
- add, if the first GR Restarter does not receive information on a complete route from a second GR Restarter, the second GR Restarter to a second GR Restarter aggregation; and
- send the information on the first selected routes to all second GR Restarters in the second GR Restarter aggregation of the first GR Restarter.

19. The device according to claim 17, wherein the processor further executes instructions to:
- denote the first selected routes as the complete routes by generating a first EOR message which does not carry a Partial flag, and
- denote the first selected routes as the incomplete routes by generating a second EOR message carrying the Partial flag.

20. A device capable of acting as a second Graceful Restart (GR) Restarter for a network with multiple GR Restarters that include the second GR Restarter and at least one first GR Restarter corresponding to the second GR Restarter, the device comprising:
- a memory, and
- a processor to execute instructions in the memory to:
  - after receiving information on routes from all neighbor network devices of the second GR Restarter, perform route selection to determine first selected routes,
  - if information on complete routes from all the neighbor network devices of the second GR Restarter are received, update a local FIB at the second GR Restarter with information on the first selected routes;
  - otherwise, send information on the first selected routes to the at least one first GR Restarter corresponding to second GR Restarter, perform route selection to determine second selected routes until information on complete routes from all neighbor network devices of the second GR Restarter are received, update the local FIB with information on the second selected routes, and send information on the second selected routes to all the neighbor network devices of the second GR Restarter;
  - wherein the second GR Restarter directly connects with the at least one first GR Restarters corresponding to the second GR Restarter.

21. The device according to claim 20, wherein the network implements a Border Gateway Protocol (BGP), and wherein the second GR Restarter and each first GR Restarter are selected from the multiple GR Restarters as slave GR Restarter and master GR Restarter respectively, and the multiple GR Restarters form an aggregation.

22. The device according to claim 20, wherein the processor further executes instructions to send the information on the first selected routes to all first GR Restarters corresponding to the second GR Restarter.

23. The device according to claim 22, wherein the processor further executes instructions to:
- if the second GR Restarter receives information on complete routes from all normal neighbor network devices of the second GR Restarter and if information on an incomplete route from one first GR Restarter corresponding to second GR Restarter is not received, or
- if information on complete routes from all first GR Restarters are received but information on complete routes from at least two second GR Restarters are not received,
  - denote the first selected routes as incomplete routes, and
  - send information on the first selected routes denoted as the incomplete routes to all first GR Restarters corresponding to second GR Restarter and any other GR Restarter,
- if the second GR Restarter receives the information on complete routes from all the normal neighbor network devices of the second GR Restarter and does not receive information on a complete route from at most one second GR Restarter corresponding to second GR Restarter,
  - denote the first selected routes as the complete routes, and
  - send the information on the first selected routes denoted as the complete routes to the at most one second GR Restarter,
  - denote the first selected routes as the incomplete routes, and
  - send the information on the first selected routes denoted as the incomplete routes to all first GR Restarters corresponding to second GR Restarter and any other GR Restarter.

24. The device according to claim 20, wherein the processor further executes instructions to:
- if information on a complete route from a first GR Restarter is not received,
  - add the first GR Restarter to a first GR Restarter aggregation; and
  - send the information on the first selected routes to all first GR Restarters in the first GR Restarter aggregation corresponding to second GR Restarter.

25. The device according to claim 23, wherein the processor further executes instructions to denote the first selected routes as the complete routes by generating a first EOR message which does not carry the Partial flag, and denote the first selected routes as the incomplete routes by generating a second EOR message carrying the Partial flag.

* * * * *